United States Patent [19]
Roussel

[11] Patent Number: 5,947,462
[45] Date of Patent: Sep. 7, 1999

[54] LATCHING MECHANISM FOR FLUID CONTAINMENT ASSEMBLY

[75] Inventor: Jeff Roussel, Little Rock, Ark.

[73] Assignee: Jacuzzi, Inc., Walnut Creek, Calif.

[21] Appl. No.: 08/942,826

[22] Filed: Oct. 2, 1997

Related U.S. Application Data

[60] Provisional application No. 60/028,203, Oct. 2, 1996.

[51] Int. Cl.[6] .................... B65D 45/30; B01D 25/00
[52] U.S. Cl. ............... 270/232; 210/244; 210/238; 220/319; 220/324
[58] Field of Search ................ 49/324; 292/256.5, 292/256.67, 256.69, 209, 11; 210/348, 244, 453, 169, 416.2, 454, 445, 444, 232, 238; 220/319, 320, 321, 324; 215/276, 216, 217, 219

[56] References Cited

U.S. PATENT DOCUMENTS

| | | | |
|---|---|---|---|
| 3,233,769 | 2/1966 | Jessop | 215/216 |
| 3,924,772 | 12/1975 | Magnani | 215/276 |
| 4,617,117 | 10/1986 | Messinger et al. | 210/232 |
| 5,151,180 | 9/1992 | Giordano et al. | 210/264 |
| 5,770,065 | 6/1998 | Popoff et al. | 210/232 |

Primary Examiner—Jay H. Woo
Assistant Examiner—Frank M. Lawrence
Attorney, Agent, or Firm—Limbach & Limbach L.L.P.

[57] ABSTRACT

A pump and filter assembly comprising a filter cover secured onto a filter body by a locking ring. A one-piece latching mechanism, integral to the locking ring and composed of flexible material, biases a latching end of the latching mechanism against the locking ring, causing the latching end of the latching mechanism to project through a slit in the locking ring into a notch on the outside of the filter body when the filter body is completely threadably engaged with the locking ring. The latching portion of the latching mechanism is easily biased away from the slit and the notch, facilitating disengagement of the locking ring from the filter body and filter cover. The entire latching mechanism is itself easily removed from the locking ring, facilitating repair or replacement of the latching mechanism.

14 Claims, 5 Drawing Sheets

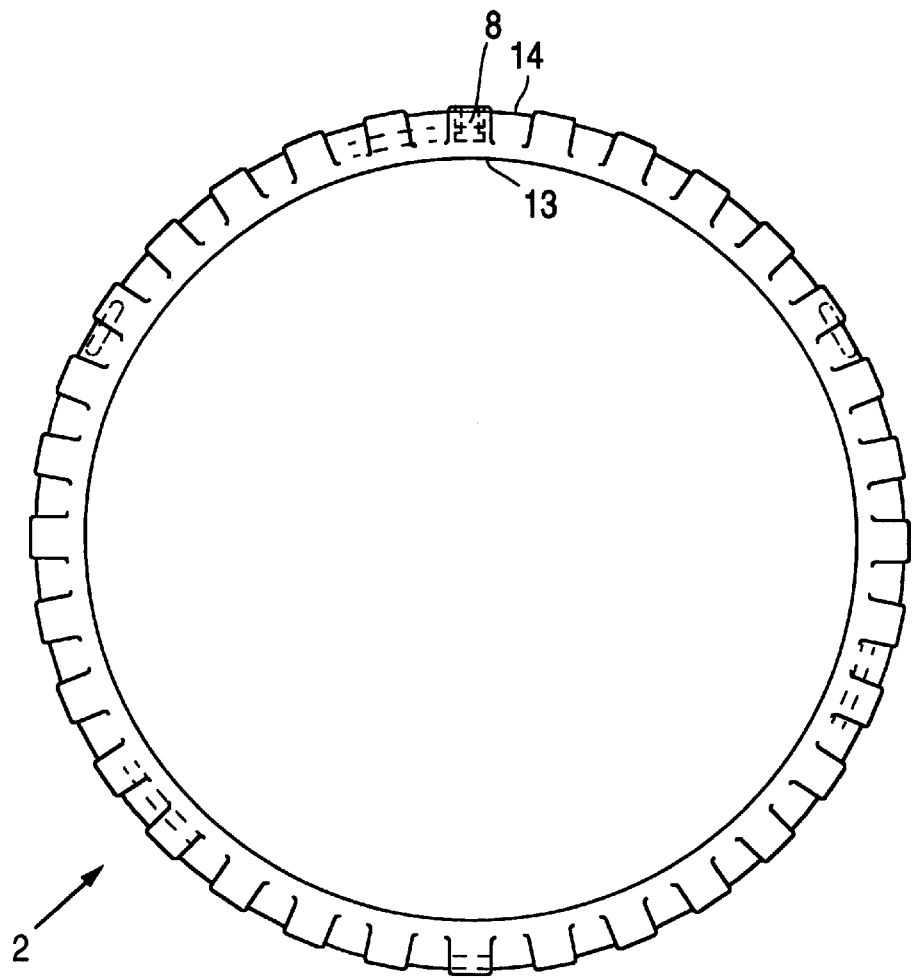
FIG. 2A
FIG. 2B
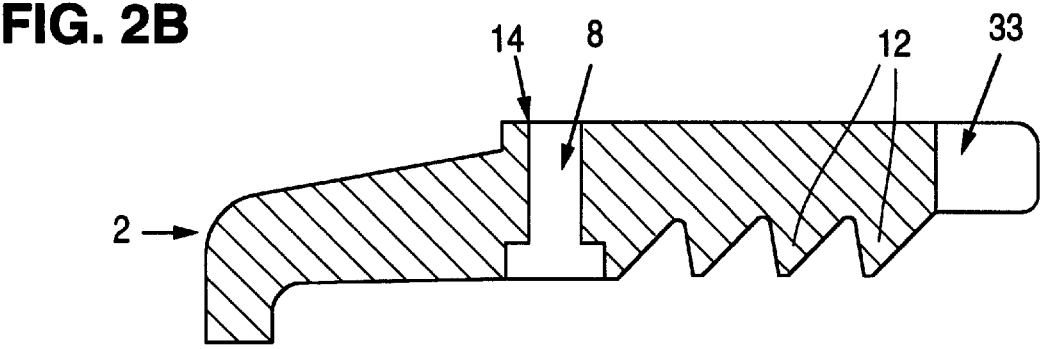

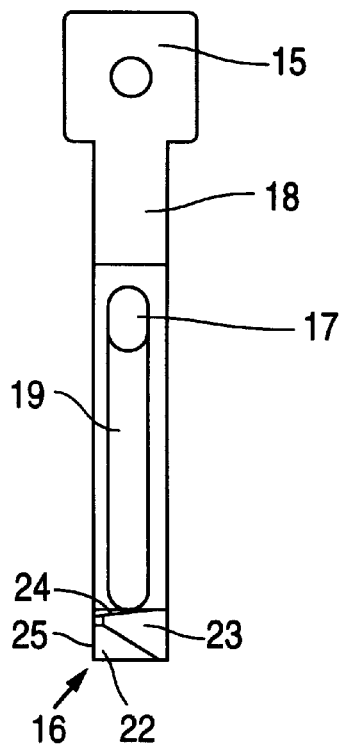
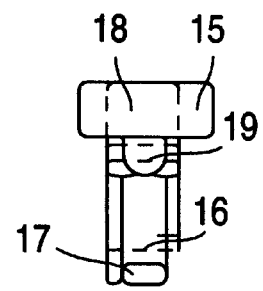
FIG. 4B
FIG. 4A
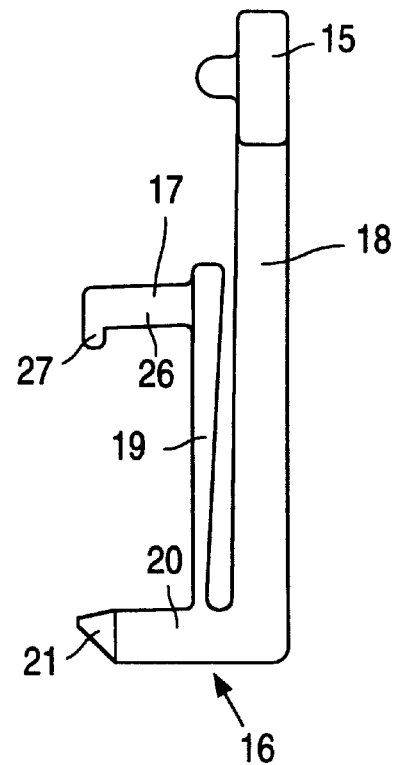
FIG. 4C

LATCHING MECHANISM FOR FLUID CONTAINMENT ASSEMBLY

This application claims the benefit of U.S. Provisional application No. 60/028,203, filed Oct. 2, 1996.

BACKGROUND OF THE INVENTION

1. Field of the Invention

The present invention relates generally to fluid containment assemblies, and particularly to a filter and pump assembly utilized in pools, hot tubs and heated baths having both threaded connections and a latching mechanism to prevent disengagement of the coupled components of the assembly.

2. Description of the Related Art

A common household application calling for the circulation of fluids under medium pressures are backyard swimming pool and hot tub filter assemblies. Pools and hot tubs generally require that water be circulated under pressure to allow for homogeneous water quality chemical treatment, and to prevent the unwanted growth of organisms arising out of stagnant water.

Swimming pool or hot tub water circulation assemblies typically include various filter elements designed to collect debris for easy removal. These filters regularly become full of debris, and thus pool circulation assemblies are designed to permit easy access to them.

A fluid containment assembly described above typically includes a threaded filter body coupled to a filter cover, the filter body and cover being held together by a locking ring or "nut" designed to threadably engage the body or "bolt." Tightening the locking ring to the filter body ensures that the filter cover will not separate from the body under pressure. A filter assembly also includes a seal (typically of O-ring shape) which functions to prevent materials from entering or exiting the filter assembly through the boundary between the filter body and the filter cover.

Undesirable separation of the filter cover from the filter body may occur if the locking ring is allowed to "back off" or unscrew from the filter body. Such unwanted separation can compromise the seal and the performance of the entire assembly.

Prior designs for fluid containment assemblies have suffered from a number of disadvantages. One disadvantage has been an inability to securely latch the filter body to the cover. Another disadvantage has included a design which requires the user to apply substantial physical strength in order to unlatch the assembly. Yet another disadvantage inherent to existing designs has been fabrication of the fluid containment assembly out of a complex arrangement of multiple parts, making operation of the assembly cumbersome, and increasing the cost of manufacture and production.

SUMMARY OF THE INVENTION

The present invention is a fluid containment assembly whose components are threadably connected, and which also includes a latching mechanism to positively and securely lock the components of the assembly into place, thereby preventing undesirable disengagement or "backing off" of one part of the assembly from another. Advantageously, the latching mechanism of the invention includes a latching member of a one-piece design that is easy to assemble and replace if required. A further advantage of the present invention is that the latching mechanism automatically latches when the locking ring is securely coupled to the filter body after the seal is formed. A still further advantage of the present invention is that the latching mechanism will not unlatch without affirmative human intervention. Thus, the user can bias a portion of the latching mechanism to easily unlock it. Otherwise, the latching mechanism remains firmly in place, reliably ensuring tight engagement between the components of the assembly.

Of further advantage to the user is that the latching mechanism can be integral with the locking ring, moving with the locking ring instead of being fixed to stationary parts. When in place, the latching mechanism is securely coupled to the locking ring. However, if the latching mechanism requires replacement, it can easily be removed from the locking ring.

BRIEF DESCRIPTION OF THE DRAWINGS

The invention will be better understood with reference to the appended figures in which:

FIG. 2A shows a top view of a locking ring;

FIG. 2B shows a cross-sectional view of the locking ring of FIG. 2A;

FIGS. 4A–4C show detailed side, front and top views of the latching mechanism;

DETAILED DESCRIPTION

The following FIGS. 1–5 illustrate the fluid containment assembly in accordance with the present invention with reference to a specific structure, i.e., a pool filter assembly comprising a filter body and a separate filter cover and locking ring. However, it is to be understood that the features of the present invention are applicable to fluid containment assemblies (various types of medium pressure filters) in general, including a filter assembly having a filter cover integral with a locking ring structure. That is, while the locking ring of the preferred embodiment is shown separately, those skilled in the art will understand that the ring could be formed as an integral part of a unitary cover/ring combination.

While detailed dimensions for the preferred embodiment have been included to ensure a proper understanding of the invention, it is to be understood that the claims shall not be construed as limited to these dimensions.

Figure 1A:
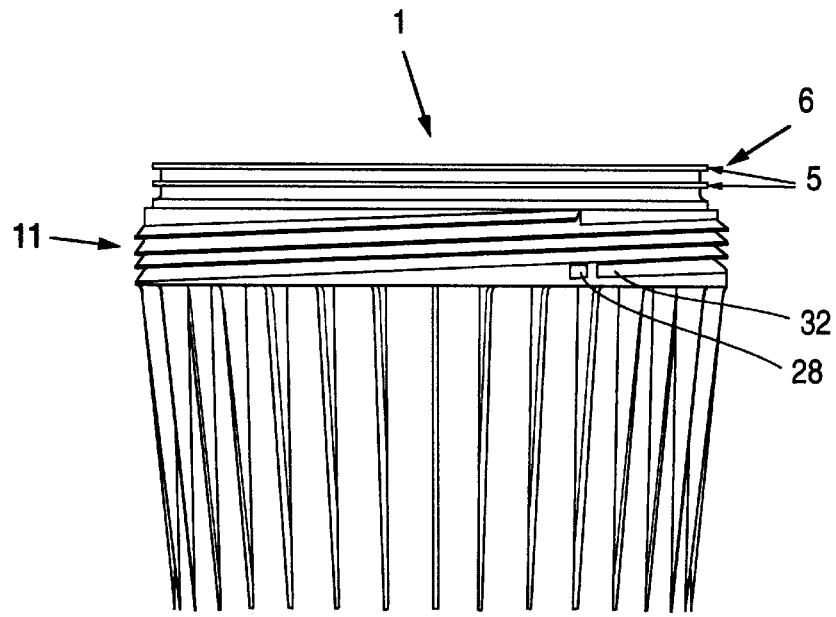
FIG. 1A shows a side view of one portion of a filter body.

FIG. 1A shows a side view of a cylindrical filter body 1 having two protruding rings 5 between which a conventional O-ring may be placed. The protruding rings 5 are located at the top portion 6 of the filter body 1. The protruding rings 5 are spaced apart such that an appropriately sized O-ring may be accommodated between them.

Filter body 1 also has three separate helical threads 11 designed to engage the corresponding threads of a locking ring, similar to the way a conventional nut would engage a conventional bolt. Filter body 1 also has a notch 28 positioned immediately proximate to the end 32 of helical threads 11.

Figure 1B:
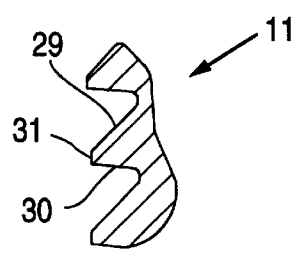
FIG. 1B shows a detailed view of the threads of the filter body portion of FIG. 1A.

FIG. 1B shows the specific arrangement of threads 11 on filter body 1, with thread edges 29 facing toward the top portion 6 of the filter body 1 at a 45° angle towards the direction of the diameter of the filter body 1, and thread edges 30 facing away from the top portion of the filter body at a 7° angle toward the direction of the diameter of the filter body such that the two edges 29,30 approximately meet to form an acute angle of approximately 52°. The two edges do not exactly intersect, but are separated by a plateau 31 which is approximately 0.054" wide.

Figure 1C:
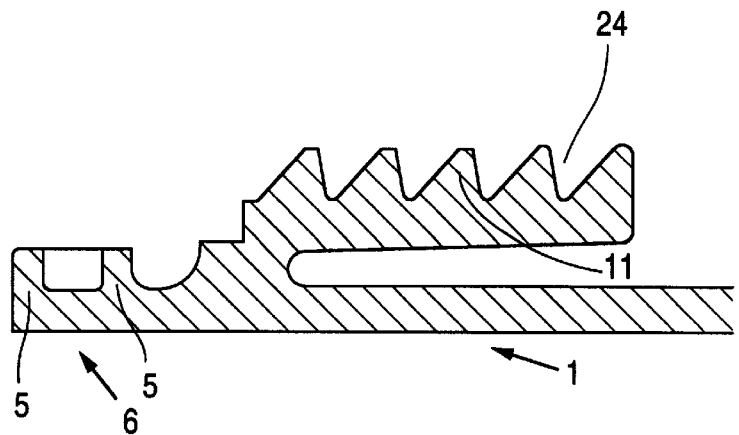
FIG. 1C shows cross-sectional view of the filter body portion 1 (shown rotated 90 degrees relative to the view of FIG. 1A)

FIG. 1C shows a cross-sectional view of filter body 1, with the filter body rotated 90 degrees from the view of FIG. 1A, only for ease of illustration. Subsequent cross-sectional drawings maintain this orientation of the filter assembly for the sake of consistency. The relative positions of threads 11 and protruding rings 5 remain unchanged.

FIG. 2A shows a top view of cylindrical locking ring 2. FIG. 2B shows a cross-sectional view of the cylindrical locking ring 2. Locking ring 2 includes an interior surface having threads 12 designed to engage with threads 11 of filter body 1. Locking ring 2 also includes a cavity 8 for coupling with a latching mechanism, and also includes a slit 33.

Figure 3A:
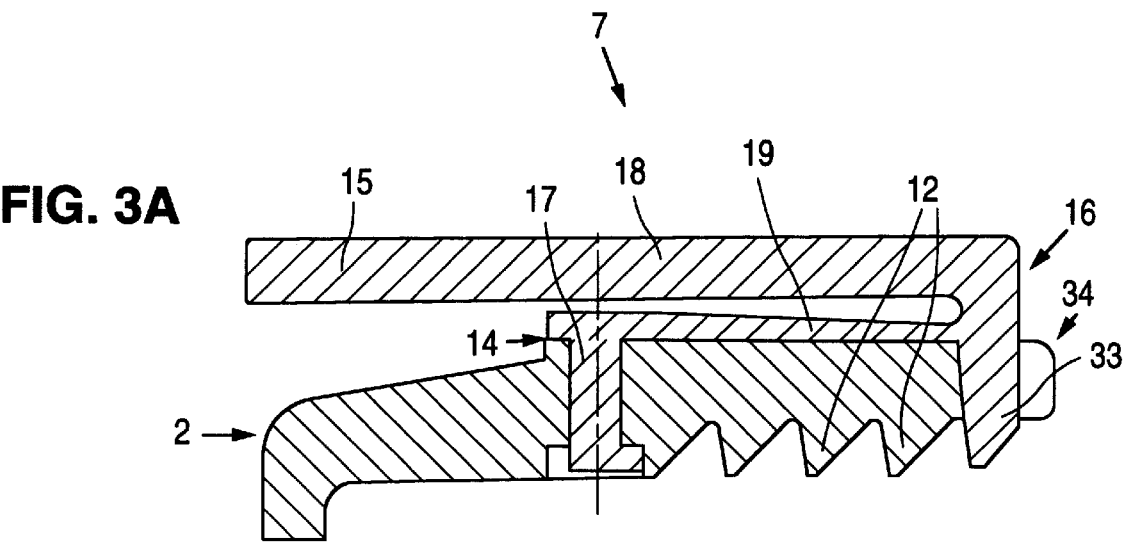
FIG. 3A shows a cross-sectional view of the locking ring including the latching mechanism inserted therein.
Figure 3B:
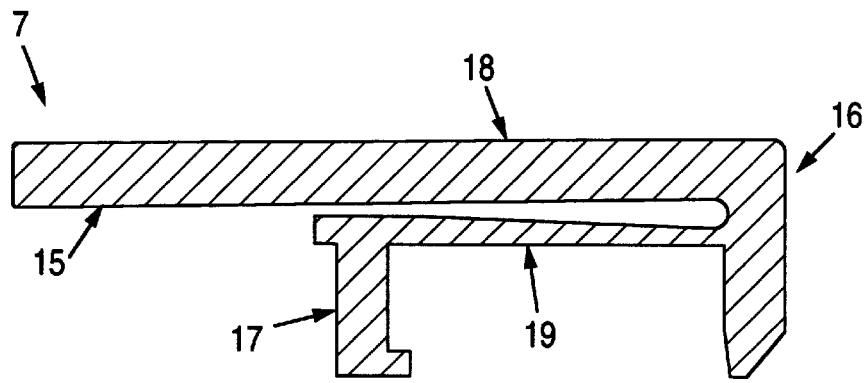
FIG. 3B shows a cross-sectional view of the latching mechanism.
Figure 3C:
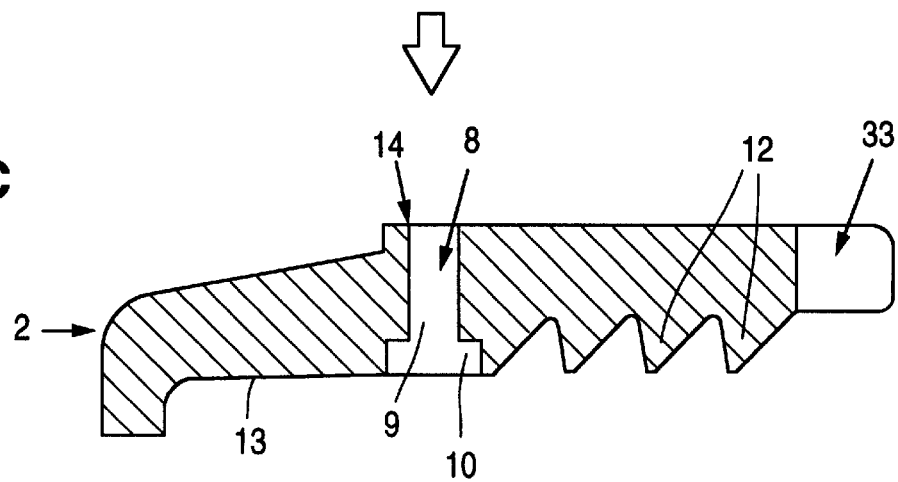
FIG. 3C shows a cross-sectional view of the locking ring without the latching mechanism inserted therein.

FIG. 3 shows that latching mechanism 7 is designed to be removable from locking ring 2 to facilitate replacement or repair. Specifically, cavity 8 of locking ring 2 is designed to accommodate coupling of the latching mechanism 7. Cavity 8 includes an inner elliptical cylindrical section 9 and an outer circular cylindrical section 10. In a particular embodiment, elliptical section 9 has a major axis diameter of approximately 0.41" and a minor axis diameter of approximately 0.21." Circular section 10 has a diameter of approximately 0.41." Cavity 8 extends from the inner surface 13, to the outer surface 14, of locking ring 2. The height of circular section 10 is approximately 0.116" and extends from the inner surface 13 of the locking ring 2, to one end of the elliptical section 9 which extends the remainder of the way to the outer surface 14 of the locking ring 2.

FIGS. 4A–4C show detailed side, front and top views of latching mechanism 7. Latching mechanism 7 is a single, continuous, polymeric element which includes a depression end 15, a latching end 16, a central coupling portion 17, a center portion 18, and a flex portion 19.

In a particular embodiment of the present invention, the depression end 15 is approximately 0.65" in length and width and is approximately equal in thickness to that of the center portion 18. The center portion 18 is approximately 0.35" in width and 2.55" long extending from the depression end 15 to the latching end 16. The latching end 16 includes a right rectangular solid section 20 of approximately 0.75" in length, 0.35" in width and 0.25" in thickness. The latching end 16 further includes a pyramidal section 21 whose base is a 0.35" by 0.25" and is a side of the rectangular section 20. The pyramidal section 21 has an altitude of approximately 0.25" and has four lateral faces angled, respectively, at 45° 22, 60° 23, 7° 24, and 0° 25 with respect to the direction of altitude of the pyramidal section 21.

The flex portion 19 extends in length about 1.70" from a point on the rectangular section 20 0.125" from the center portion 18 at which point the thickness of the flex portion is 0.075" and its width is approximately equal to that of the center portion 18. The thickness of the flex portion increases going away from the latching end 16 approximately linearly and is approximately 0.15" at the end furthest from the latching end 16 and closest to the depression end 15.

The coupling portion 17 includes a circular cylindrical section 26 which is 0.450" long and 0.200" in diameter and whose perimeter crosses 0.100" from the thickest end of the flex portion 19 and an elliptical cylindrical section 27 which is coupled to the circular section 26 and whose major axis is 0.300" and whose minor axis is 0.200". The circular section 26 protrudes from the flex portion 19 such that the axis of the circular cylinder 26 is at angle of 2 degrees with respect to a line which is perpendicular to the direction of the length of the flex portion 19 and the major axis of the elliptical section 27 lies in the direction of the length of the flex portion 19. The cylindrical axes of the circular section 26 and the elliptical section 27 of the coupling portion 17 are parallel.

Figure 5A:
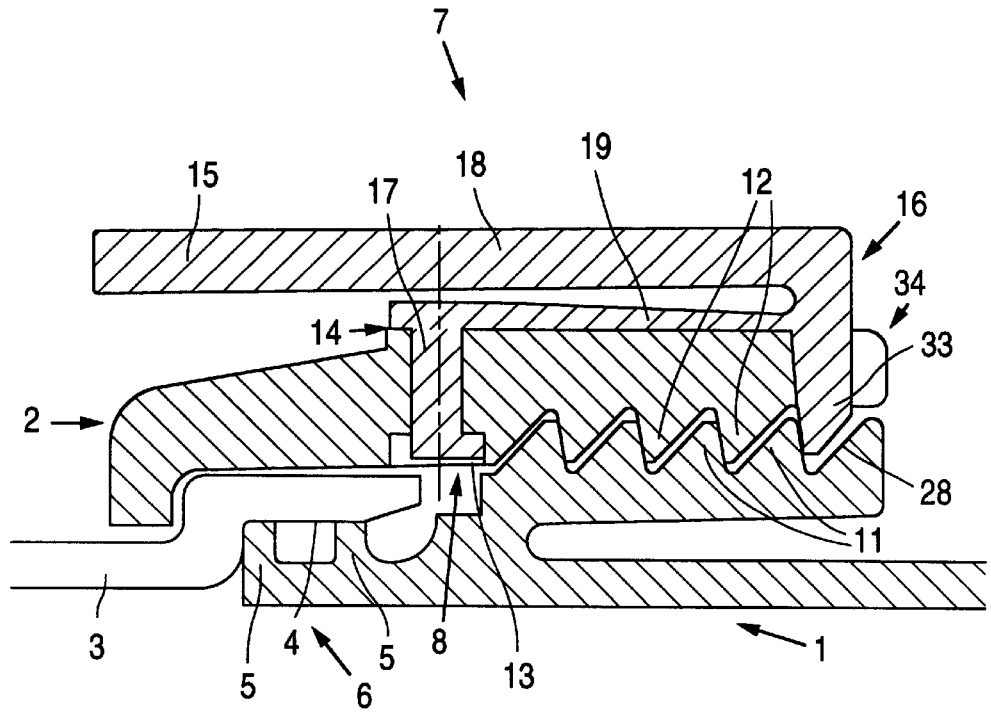
FIG. 5A shows the filter assembly with the latching mechanism in a latched position.
Figure 5B:
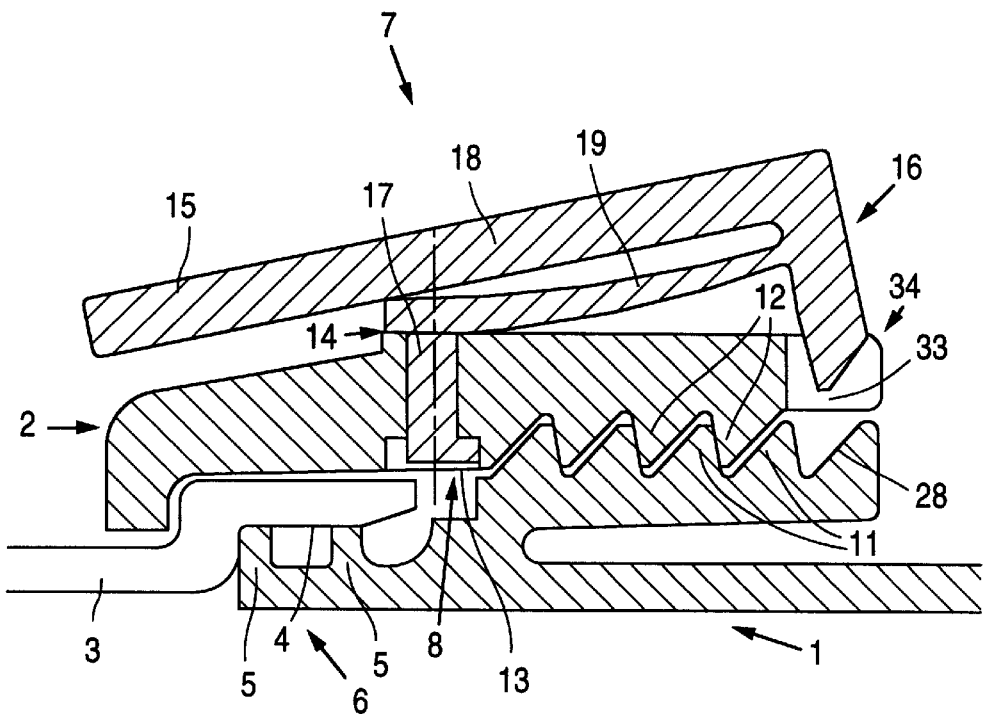
FIG. 5B shows the filter assembly with the latching mechanism in an unlatched position.

The operation of the filter assembly in accordance with the present invention is illustrated with respect to FIGS. 5A and 5B. The filter assembly further includes a filter cover 3 having an inner surface 4 which is smooth and an inner radius which is approximately equal to the outer radius of filter body 1 at the top of protruding rings 5, which are located at the top portion 6 of filter body 1. The outer radius of filter cover 3 is approximately equal to the inner radius of locking ring 2.

Filter cover 3 is first coupled to the filter body 1 by simply fitting the filter cover 3 over the protruding rings 5 of the filter body 1 with an O-ring providing a tight seal. When the filter cover 3 and filter body 1 are coupled together in this way, the inner surface 4 of the filter cover 3 is in physical contact with the O-ring lying between the protruding rings 5 of the filter body 1.

Filter body 1 is provided with helical threads 11 and the locking ring 2 is provided with helical threads 12, such that the helical threads 11 of filter body 1 and helical threads 12 of locking ring 2 are mutually engageable. Filter body 1 and the locking ring 2 may be coupled together by interlocking the helical threads 11 and 12 like a nut and a bolt.

When the filter body 1 and the locking ring 2 are engaged, the filter cover 3 is physically trapped between them and the O-ring seal is well preserved. When the latching mechanism 7 is coupled with the notch 28, this physical entrapment of the filter cover which forces the O-ring seal to be maintained is inescapable unless the latching mechanism 7 and the notch 28 are affirmatively disengaged. That is, while some displacement may occur, the cover is not permitted to move any distance which would compromise the seal between the cover and the filter body.

The present invention provides the advantage that when the notch 28 is coupled with the latching mechanism 7, the notch 28 and latching mechanism 7 prevent the locking ring 2 from decoupling from the filter body 1 and cover 3 via relative counterclockwise angular displacement because a physical polymeric barrier lies between the notch 28 and the end 32 of the threads 11 of filter body 1.

Disengagement of the filter body assembly is illustrated in FIG. 5B. Disengagement of the latching mechanism 7 from the notch 28 will be achieved when an external physical force greater than that of any mechanical forces is exerted on the depression end 15 of the latching mechanism 7. This force must be exerted in a direction substantially perpendicular to the direction of the length of the flex portion 19 and radially inward toward the mutual centers of the filter body 1 and the locking ring 2.

While under pressure, friction ordinarily prevents any relative angular displacement between the filter cover 3 and either the filter body 1 or the locking ring 2. For example, the latch could be released and there would be no displacement. However, when the filter is pressurized or depressurized the latching mechanism holds the filter assembly substantially without movement of the parts one relative to the other.

Thus, the latching mechanism in accordance with one embodiment of the present invention is advantageous because it provides a means for preventing undesirable relative angular disengagement of filter body 1 and locking ring 2 when the filter body 1 and the locking ring 2 in accordance with the present invention are fully engaged. In particular, a portion of latching mechanism 7 integral to locking ring 2 is biased to project through slit 33 into notch 28 when the locking ring and filter body are completely threadably engaged.

While the specific embodiment of the present invention illustrated above in FIGS. 1–5 is a filter assembly having a filter cover separate from a locking ring, the latching mechanism of the invention can be used advantageously in many other fluid containment assemblies, such as pump assemblies or assemblies having a cover integral with a locking ring. Therefore, it is intended that the following claims define the scope of the invention, and that additional methods and structures falling within the scope of these claims and their equivalents be covered thereby.

What is claimed is:

1. A fluid containment assembly comprising:
    a container having an opening;
    a container cover;
    a locking ring threadably engageable with the container to secure the container cover over the opening; and
    a mechanism for latching the locking ring to the container such that the locking ring cannot rotate relative to the container, the mechanism positioned on the locking ring and including an end projecting through the locking ring and into the container.

2. The fluid containment assembly of claim 1, wherein the container is a filter body.

3. The fluid containment assembly of claim 1, wherein the container is a pump housing.

4. A fluid containment assembly comprising:
    (a) a container having an opening and an outer surface including threads and a notch;
    (b) a cover adapted to fit over the opening;
    (c) a locking ring for securing the cover over the opening, the locking ring having threads on an inside surface and a slit extending from the inside surface to an outside surface, the slit aligned with the notch when the locking ring completely threadably engages the container; and
    (d) a latching mechanism biased against the external surface of the locking ring such that a part of the latching mechanism projects through the slit and enters the notch when the locking ring completely threadably engages the container, the latching mechanism including a depression end positioned on the locking ring and depressible by a user to bias the latching mechanism away from the external surface of the locking ring.

5. The fluid containment assembly of claim 4 wherein the latching mechanism is a one piece polymeric element integral to the locking ring.

6. The fluid containment assembly of claim 5, wherein the container is a filter body.

7. The fluid containment assembly of claim 5, wherein the container is a pump housing.

8. The fluid containment assembly of claim 4, wherein the latching mechanism further comprises:
    a central coupling portion secured to the locking ring and having an upper end projecting from the outer surface of the locking ring;
    a flex portion, joined to the upper end of the central coupling portion, extending parallel to the outer surface of the locking ring from the central coupling portion toward the slit;
    a latching end perpendicular to the flex portion and having upper and lower portions, the flex portion biasing the lower portion of the latching end toward the locking ring such that the lower portion of the latching end is capable of protruding through the slit;
    a center portion joined at a first end to the upper portion of the latching end and extending above the flex portion; and
    a second end of the center portion forming the depression end, such that when the locking ring is completely threadably engaged with the container, the flex portion biases the lower portion of the latching end through the slit into the notch, and movement of the depression end toward the locking ring causes the lower portion of the latching end to disengage from the notch and move away from the slit.

9. A fluid containment assembly comprising:
    (a) a container having an external surface and an internal surface, and having an opening such that the external surface proximate to the open end is threaded and includes a notch;
    (b) a locking ring having an inner surface and an outer surface and having an open end, such that the inner surface proximate to the open end has threads adapted to engage the external surface of the container, the locking ring defining a cavity and a slit, the cavity and the slit extending from the internal surface to the external surface, such that the slit overlaps the notch when the locking ring is completely threadably engaged with the container;
    (c) a cover adapted to cover the opening and to be secured in place by the locking ring; and
    (d) a single, flexible polymeric latching mechanism including:
        (1) a central coupling portion secured within the cavity and having an upper end projecting through the outer surface of the locking ring;
        (2) a flex portion, joined to the upper end of the central coupling portion, extending parallel to the outer surface of the locking ring from the central coupling portion toward the slit;
        (3) a latching end perpendicular to the flex portion and having upper and lower portions, the flex portion biasing the lower portion of the latching end toward the locking ring such that the lower portion of the latching end is capable of protruding through the slit; and
        (4) a center portion joined at a first end to the upper portion of the latching end and extending above the flex portion, a second end of the center portion forming a depression end, such that when the locking ring is completely threadably engaged with the container, the flex portion biases the lower portion of the latching end through the slit into the notch,
    whereby movement of the depression end toward the locking ring causes the lower portion of the latching end to disengage from the notch and move away from the slit.

10. A filter assembly comprising:

a filter body having an external threaded surface;

a locking ring having an internal threaded surface adapted to receive the filter body;

a filter cover interposed between the filter body and the locking ring, the filter cover secured against the filter body by threaded engagement of the locking ring with the filter body; and a means for latching the locking ring to the filter body, said latching means integral to the locking ring and removable from the locking ring, such that when the locking ring is completely threadably engaged with the filter body, a portion of the latching means projects through a slit in the locking ring into a notch in the filter body, thereby preventing movement of the locking ring relative to the filter body.

11. The filter assembly of claim 10, wherein the latching means includes:

a single continuous flexible polymeric latching element integral to the locking ring and having a latching end biased against the locking ring.

12. A latching mechanism for a fluid containment assembly having a container cover secured to a container by a locking ring, the latching mechanism comprising:

a single continuous flexible polymeric latching element integral to the locking ring and having a latching end biased against the locking ring, such that the projecting member moves through a slit in the locking ring and securely engages a notch in the container.

13. A method for securing a cover upon a fluid containment housing comprising the steps of:

placing the cover against walls of the housing that define an opening;

coupling a locking ring with the fluid containment housing and with the cover; and causing a flexible latching member integral to the locking ring to project through a slit in the locking ring into a notch in the fluid containment housing, such that the fluid containment housing is fixed relative to the locking ring.

14. The method of claim 13, wherein the step of coupling a locking ring with the fluid containment housing and the cover includes:

threadably engaging a locking ring having threads along an internal surface with a fluid containment housing having threads along an external surface.

* * * * *